United States Patent
Yajima et al.

(10) Patent No.: US 12,296,770 B2
(45) Date of Patent: May 13, 2025

(54) OCCUPANT PROTECTION DEVICE AND AIRBAG COVER

(71) Applicant: TOYODA GOSEI CO., LTD., Kiyosu (JP)

(72) Inventors: Takatoshi Yajima, Kiyosu (JP); Yuji Sato, Kiyosu (JP); Akira Yasuda, Kiyosu (JP); Kenji Kakimoto, Kiyosu (JP); Yuji Matsuzaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/768,135

(22) Filed: Jul. 10, 2024

(65) Prior Publication Data

US 2025/0033589 A1 Jan. 30, 2025

(30) Foreign Application Priority Data

Jul. 26, 2023 (JP) ................. 2023-121921

(51) Int. Cl.
 *B60R 21/18* (2006.01)
 *B60R 21/215* (2011.01)
 *B60R 21/26* (2011.01)
(52) U.S. Cl.
 CPC ............ *B60R 21/18* (2013.01); *B60R 21/215* (2013.01); *B60R 21/26* (2013.01)

(58) Field of Classification Search
 CPC ....... B60R 21/18; B60R 21/215; B60R 21/26; B60R 21/2176; B60R 21/20
 See application file for complete search history.

(56) References Cited

U.S. PATENT DOCUMENTS

| | | | |
|---|---|---|---|
| 6,286,860 B1 | 9/2001 | Adomeit et al. | |
| 2015/0069741 A1* | 3/2015 | Shimazu | B60R 21/233 280/729 |
| 2020/0122668 A1* | 4/2020 | Ozaki | B60R 21/237 |
| 2022/0048460 A1* | 2/2022 | Yamada | B60R 21/207 |

FOREIGN PATENT DOCUMENTS

JP 2002-506401 A 2/2002

* cited by examiner

*Primary Examiner* — Paul N Dickson
*Assistant Examiner* — Matthew Joseph Ganci
(74) *Attorney, Agent, or Firm* — Posz Law Group, PLC

(57) ABSTRACT

An occupant protection device includes an airbag mounted on a seat of a vehicle and attached to a belt body of a seat belt in a folded state. The airbag is inflated so as to allow an inflation gas discharged from an inflator to flow into the airbag and protect an occupant seated on the seat while protruding forward. An airbag cover is formed in an elongated shape that can cover an outer periphery of part of the belt body and a folding completion body corresponding to a state where the airbag is folded, and is closed such that at least the belt body is allowed to be inserted therethrough at both ends in the longitudinal direction.

12 Claims, 16 Drawing Sheets

FIG. 3
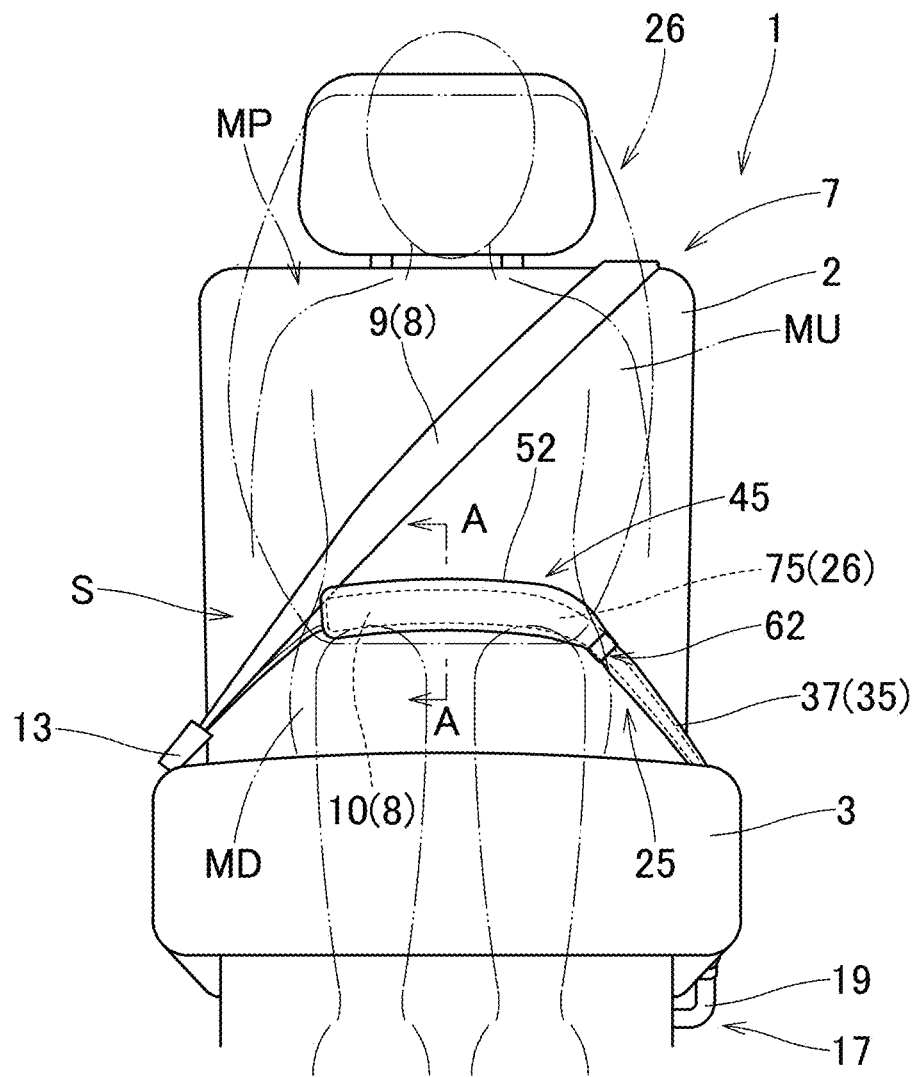
Schematic Cross Section Taken Along Line A-A
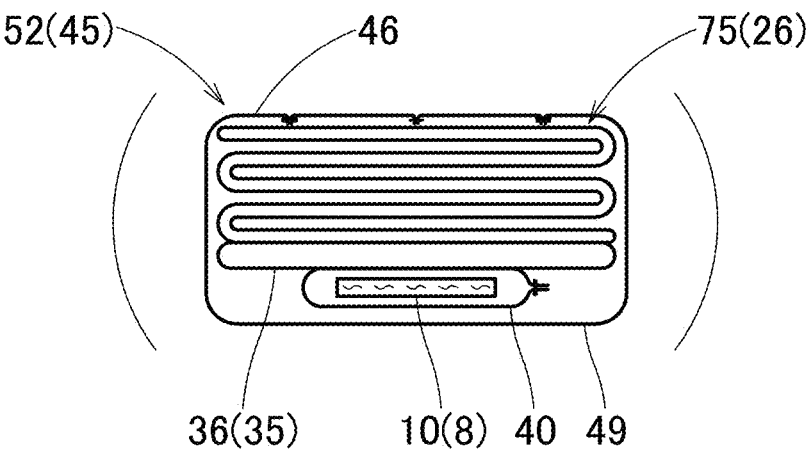

OCCUPANT PROTECTION DEVICE AND AIRBAG COVER

CROSS REFERENCE TO RERATED APPLICATION

The present application claims priority from Japanese Patent Application No. 2023-121921 of Yajima et al., filed on Jul. 26, 2023, the entire disclosures of which are incorporated herein by reference.

BACKGROUND

1. Technical Field

The present disclosure relates to an occupant protection device and an airbag cover mounted on a seat of a vehicle.

2. Description of Related Art

In the related art, JP 2002-506401 T disclosed an occupant protection device disposed on a seat. In the occupant protection device in the related art, as a configuration in which an airbag is attached to a belt body of a seat belt, an occupant seated on a seat is protected by the airbag that is inflated so as to protrude forward by allowing an inflation gas discharged from an inflator to flow into the airbag when the inflator is operated. Specifically, in the conventional occupant protection device, the airbag is disposed in the region of a lap belt that restrains the waist of the occupant at the time of wearing in the belt body. More specifically, the airbag is covered with an airbag cover in a state of being folded in an elongated shape substantially along the lap belt.

In the conventional occupant protection device, the airbag cover is disposed so as to cover the entire lap belt together with the folded airbag (folding completion body). Therefore, the entire area of the lap belt is bulky, and the wearability is not good. It is desirable to cover only the folded airbag (folding completion body) and part of the belt body with the airbag cover from the viewpoint of being mounted compactly and improving the wearability of the seat belt. However, in such a configuration, it is desired to restrain entry of foreign matter into the airbag cover.

SUMMARY

An occupant protection device of the present disclosure is mounted on a seat of a vehicle,
the occupant protection device including
a seat belt,
an inflator,
an airbag that is attached to a belt body of the seat belt in a folded state and is inflatable so as to allow an inflation gas discharged from the inflator to flow into the airbag to protrude forward and protect an occupant seated on the seat when the inflator is operated, and
an airbag cover that covers a periphery of a folding completion body corresponding to a state where the airbag is folded,
wherein
the airbag cover has an elongated shape capable of covering an outer periphery of part of the belt body and the folding completion body, and is closed at both ends in a longitudinal direction such that at least the belt body is allowed to be inserted therethrough.

BRIEF DESCRIPTION OF THE DRAWINGS

FIG. 3 is a front view of the seat of FIG. 1, and illustrates a state in which a seat belt is worn.

DETAILED DESCRIPTION

Figure 1:
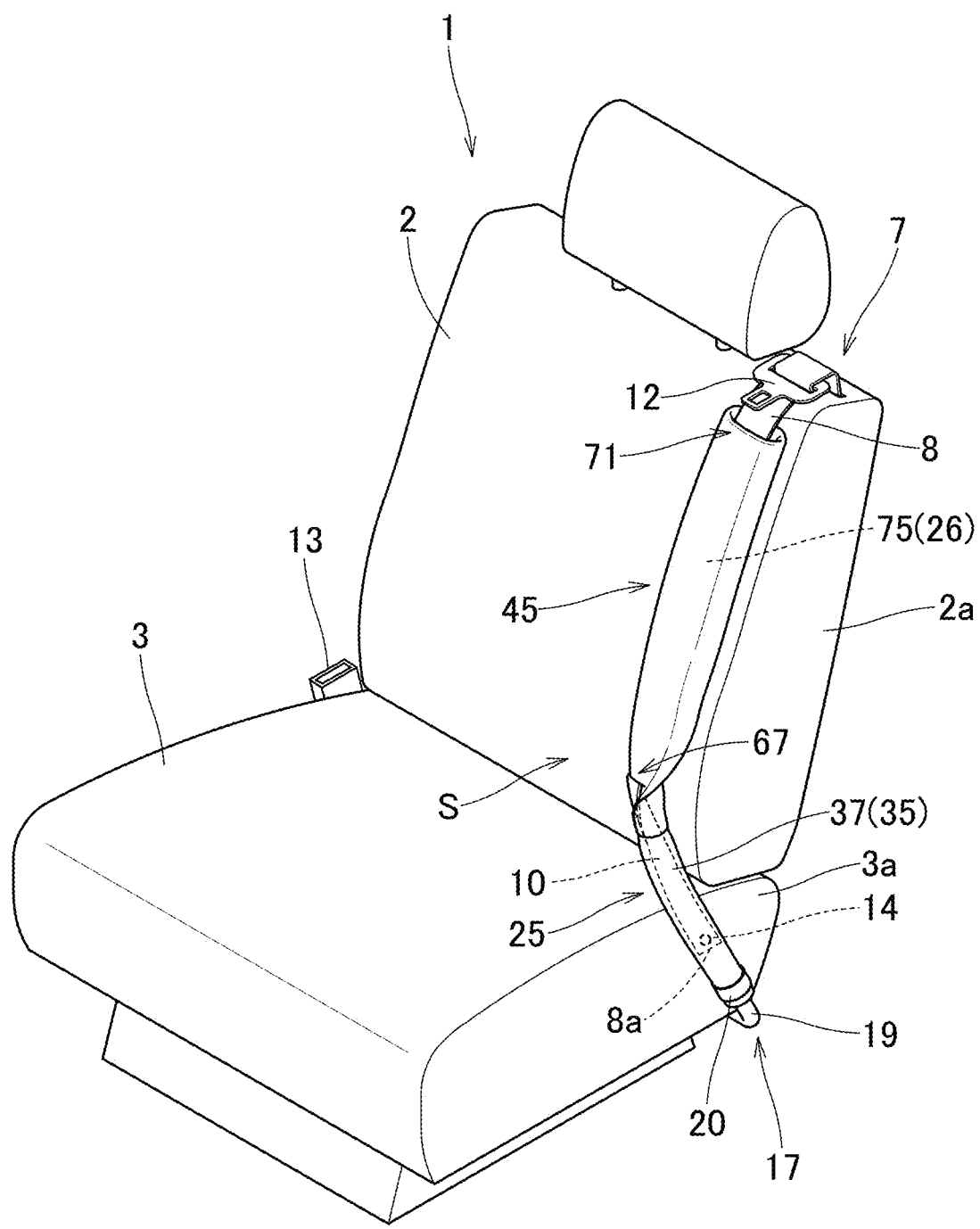
FIG. 1 is a perspective view of a seat equipped with an occupant protection device according to an embodiment of the present disclosure.

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Hereinafter, an embodiment of the present disclosure will be described with reference to the drawings. As illustrated in FIGS. 1 to 4, an occupant protection device S according to the embodiment is mounted on a seat 1 of a vehicle. The occupant protection device S includes a seat belt 7, an airbag 25, an inflator 17 that supplies an inflation gas to the airbag 25, and an airbag cover 45 that covers a periphery of a folding completion body 75 corresponding to a state where the airbag 25 is folded. In the occupant protection device S according to the embodiment, the airbag 25 is disposed in a region of a lap belt 10 in a belt body 8 of the seat belt 7 described later. The seat 1 includes a backrest portion 2 and a seat portion 3. In the embodiment, the front-rear, up-down, and left-right directions are described to coincide with the front-rear, up-down, and left-right directions with respect to an occupant MP seated on the seat 1 unless otherwise specified.

Figure 2:
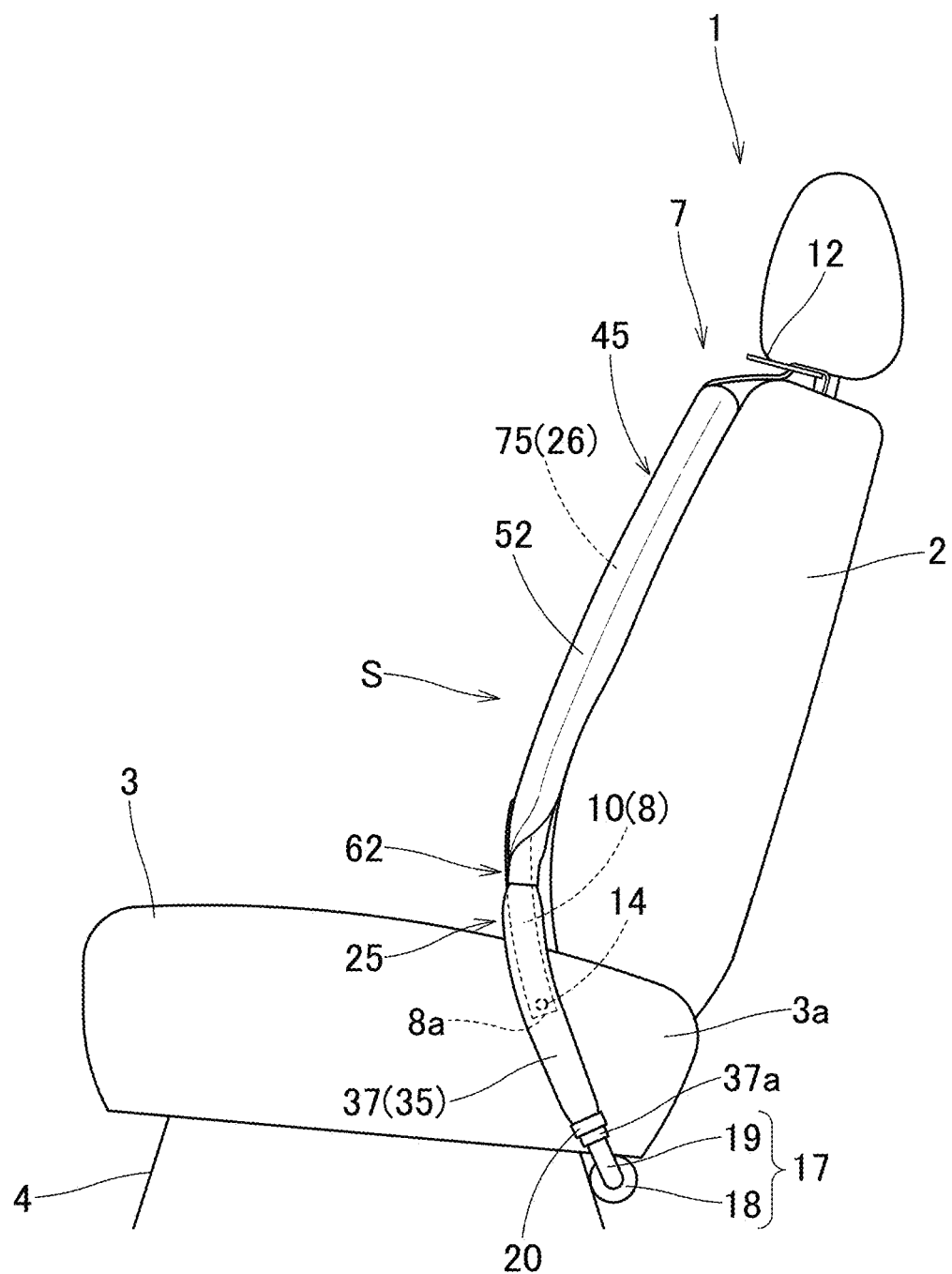
FIG. 2 is a side view of the sheet of FIG. 1.
Figure 4:
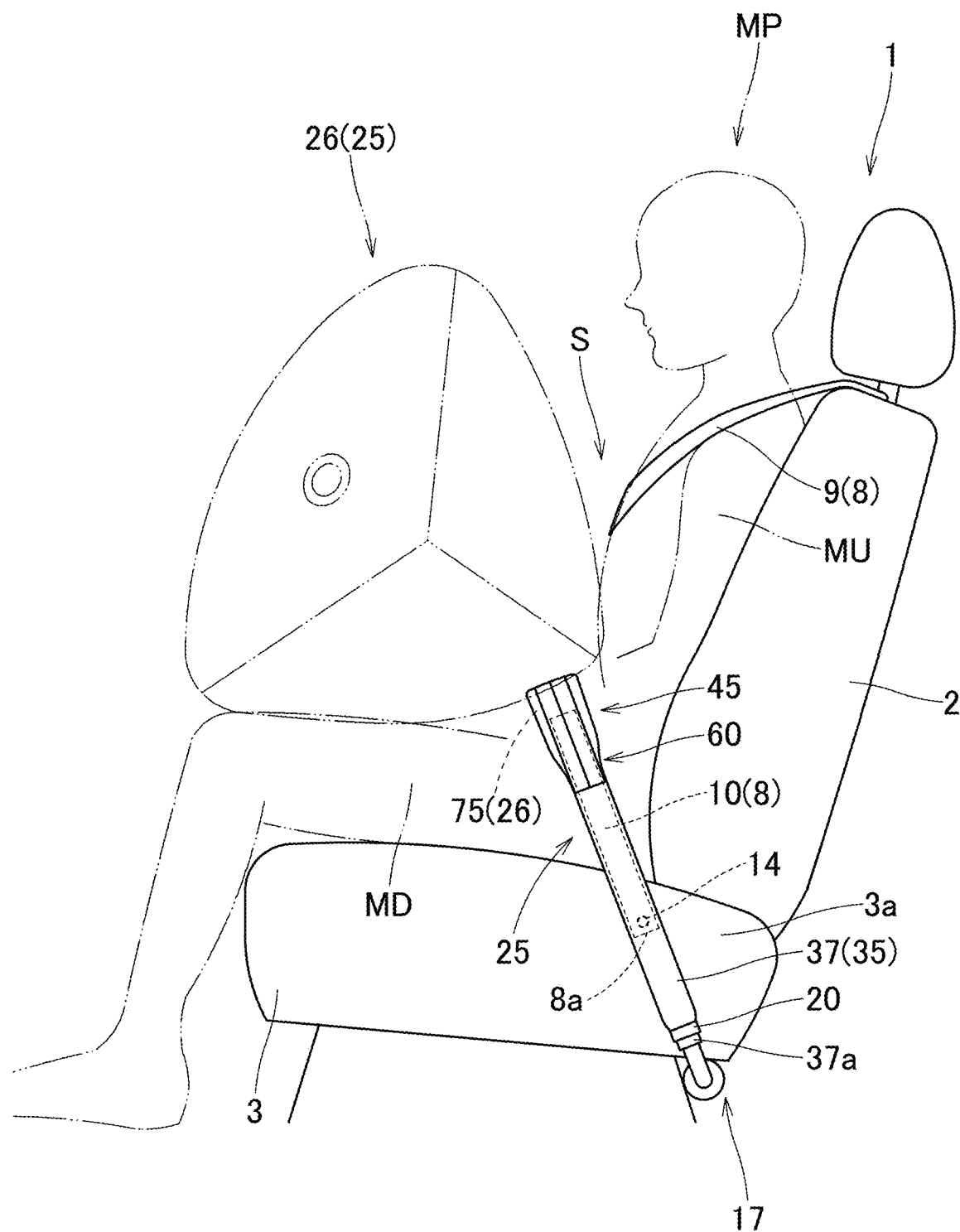
FIG. 4 is a side view of the seat of FIG. 1, illustrating a state in which a seat belt is worn.

In the embodiment, the seat belt 7 is mounted on the seat 1. As illustrated in FIGS. 1 and 2, the seat belt 7 includes a belt body 8 for restraining the occupant MP seated on the seat 1, a tongue plate 12 attached to the belt body 8, and a buckle 13 for connecting the tongue plate 12. In the embodiment, the buckle 13 is disposed at the rear right end of the seat portion 3 of the seat 1 (the right side near the boundary portion between the backrest portion 2 and the seat portion 3) (see FIGS. 1, 2, and 4). One end of the belt body 8 is locked to a winding shaft of a retractor (not illustrated) disposed in the backrest portion 2, and the other end (end portion 8*a*) is locked to the rear left end 3*a* of the seat portion 3 of the seat 1 by an anchor member 14 (see FIGS. 1, 2, and 4), so that the belt body 8 can be unreeled from the retractor at the time of wearing. Specifically, the belt body 8 is disposed so as to be exposed to the outside from the upper end left edge of the backrest portion 2. In the embodiment, in the non-seated state of the occupant MP, the belt body 8 is configured to expose the lap belt 10 on which the airbag 25 is disposed to the front face of the backrest portion 2 as illustrated in FIG. 1. Specifically, in the non-seated state of the occupant MP, the lap belt 10 is exposed to the front face of the backrest portion 2 substantially along the up-down direction at the left edge 2*a* of the backrest portion 2 as illustrated in FIG. 1. The belt body 8 includes the lap belt 10 and a shoulder belt 9 housed in the backrest portion 2. In a state where the tongue plate 12 is fastened to the buckle 13 at the time of seating of the occupant, the lap belt 10 disposed substantially along the left-right direction between the anchor member 14 and the buckle 13 restrains the lower body MD (waist, pelvic region) of the occupant MP, and the shoulder belt 9 extending from the upper end left edge of the backrest portion 2 and obliquely disposed to the buckle 13 restrains the upper body MU (from the shoulder to the chest) of the occupant MP (see FIGS. 3 and 4). In the seat belt 7, a retractor (not illustrated) disposed in the backrest portion 2 has a pretensioner mechanism.

In the embodiment, the inflator 17 is attached to the seat 1, and is specifically disposed at a position near the lower end of the seat portion 3 on the back side of the seat 1. The inflator 17 includes a substantially columnar inflator body 18 (not illustrated in detail) disposed with an axial direction substantially along the left-right direction, and a pipe portion 19 extending from the inflator body 18 and supplying an inflation gas to the airbag 25 (see FIG. 2). Although not illustrated in detail, the inflator body 18 is attached to a seat frame 4 using a predetermined bracket. The pipe portion 19 extends from the inflator body 18 and is disposed such that a distal end thereof is positioned near a boundary portion between the seat portion 3 and the backrest portion 2 on the left side of the seat 1. The distal end of the pipe portion 19 is connected to a conduit portion 35 described later in the airbag 25 using a clamp 20 (see FIGS. 1, 2, and 4). In the embodiment, the inflator body 18 is set so as to start the operation later than the pretensioner mechanism of the seat belt 7 in order to restrain the pulling-out of the belt body 8 of the seat belt 7 accompanying the expansion of the airbag 25.

Figure 5:
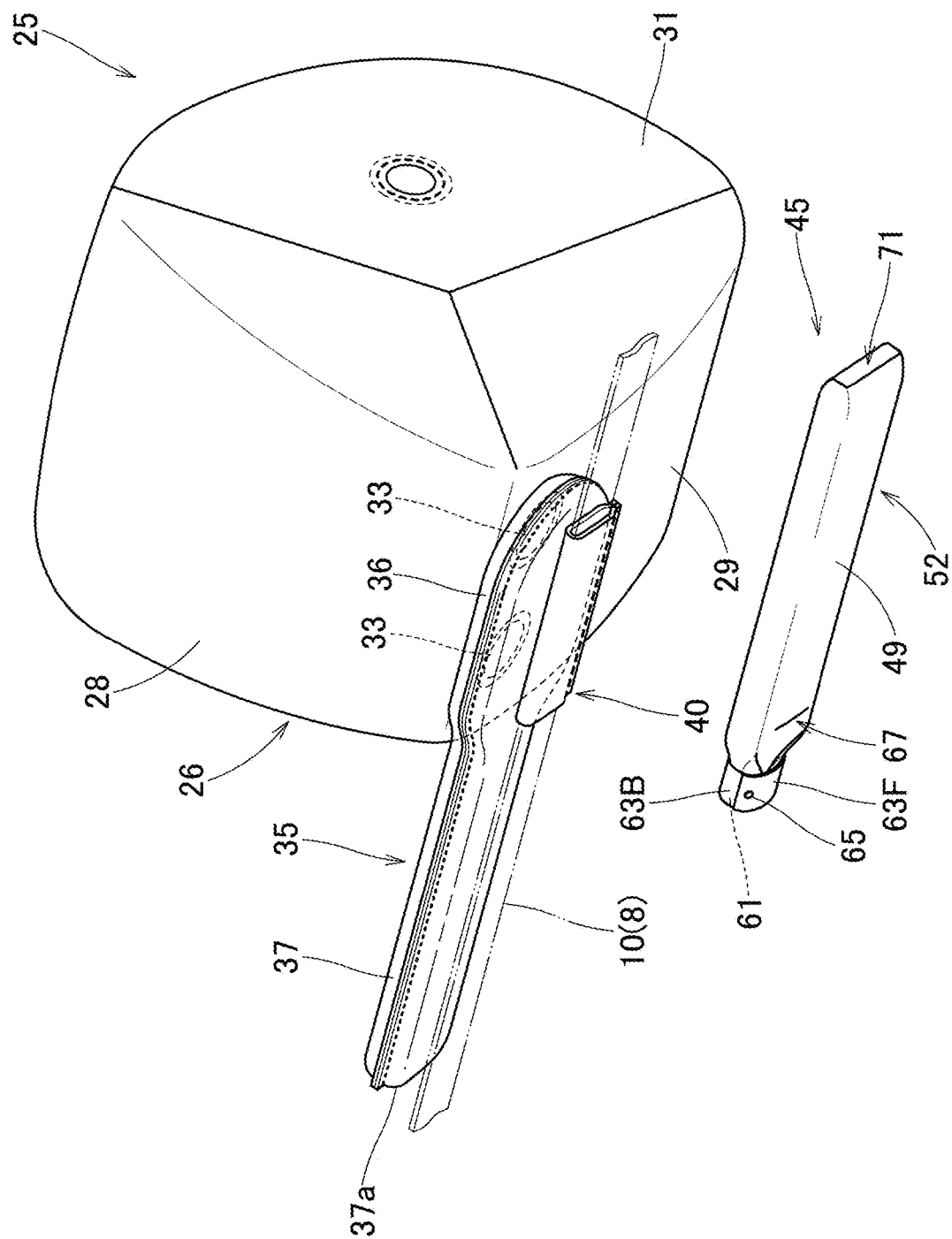
FIG. 5 is a schematic perspective view illustrating a state in which the airbag used in the occupant protection device of the embodiment is inflated alone.
Figure 6:
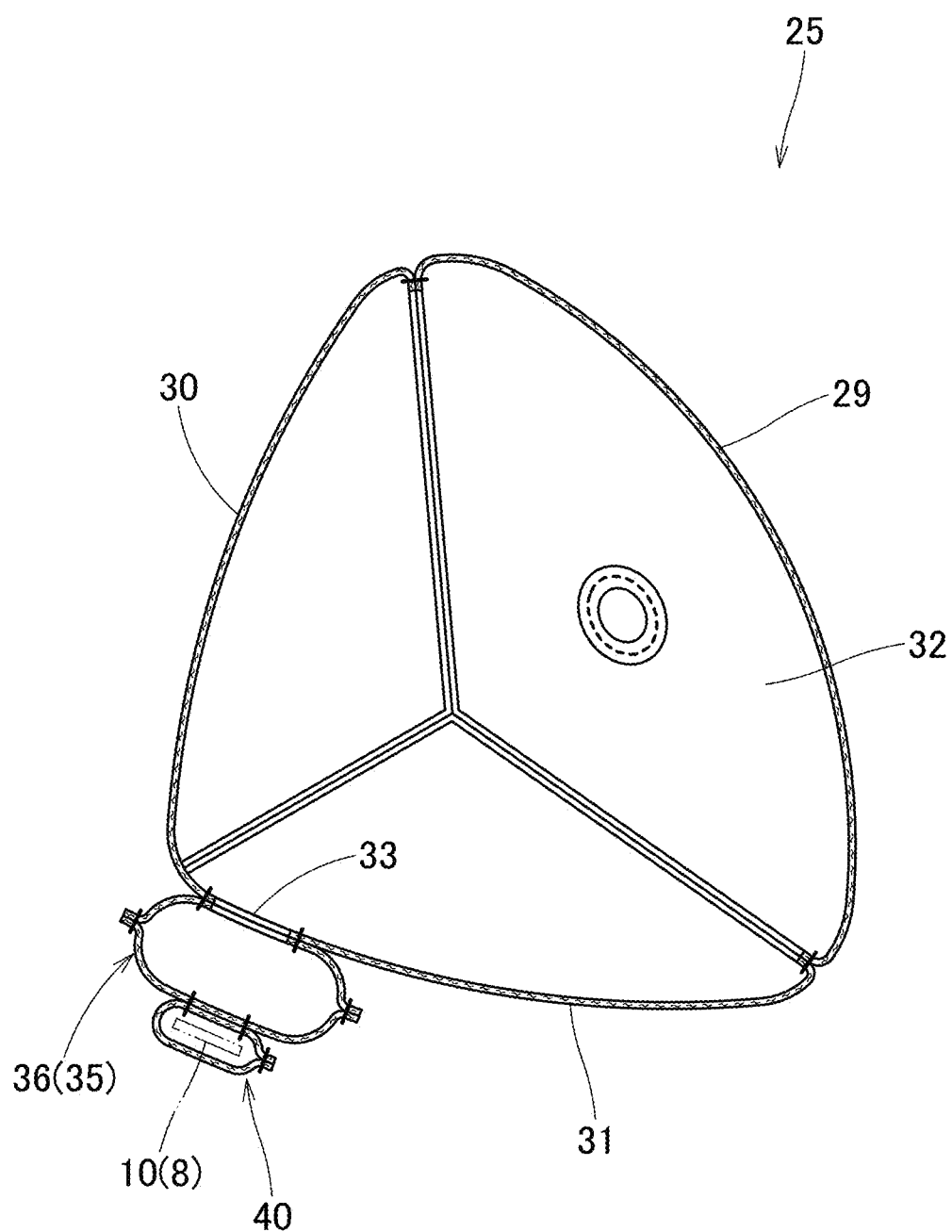
FIG. 6 is a schematic longitudinal sectional view of the airbag in FIG. 5.

As described above, the airbag 25 is disposed in a region of the lap belt 10 that restrains the lower body MD (waist) of the occupant MP seated on the seat 1, and has a bag shape formed of a flexible seat body. In the embodiment, as illustrated in FIGS. 5 and 6, the airbag 25 includes a bag body 26 that inflates so as to protect the occupant MP wearing the seat belt 7, the conduit portion 35 that is connected to the inflator 17 and allows the inflation gas to flow into the bag body 26, and a belt loop portion 40 through which the lap belt 10 is allowed to be inserted. The airbag 25 (the bag body 26, the conduit portion 35, and the belt loop portion 40) is formed of a flexible woven fabric made of a polyester yarn, a polyamide yarn, or the like.

Figure 16:
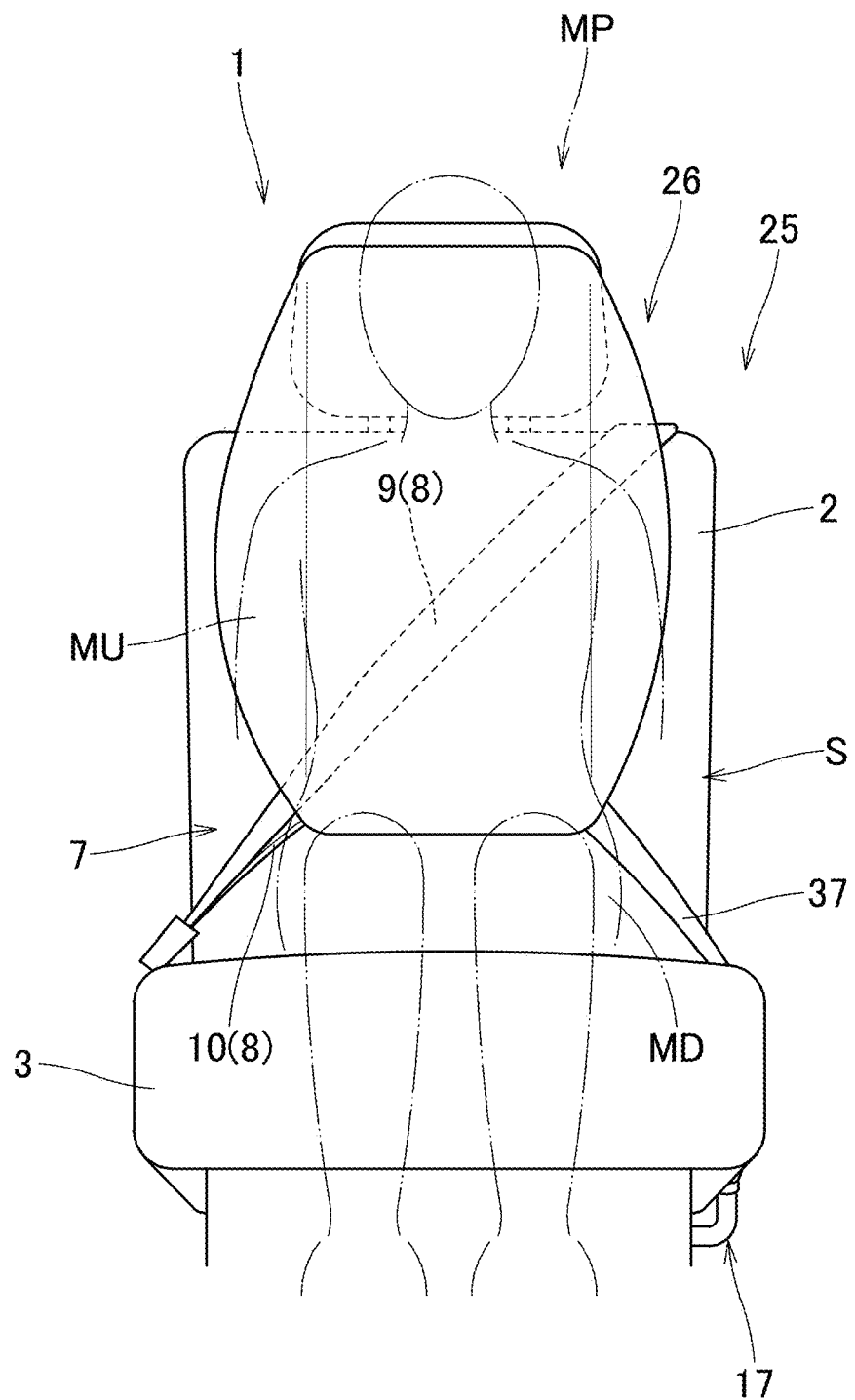
FIG. 16 is a front view of the seat in a state where the airbag completes inflation in the occupant protection device according to the embodiment.
Figure 17:
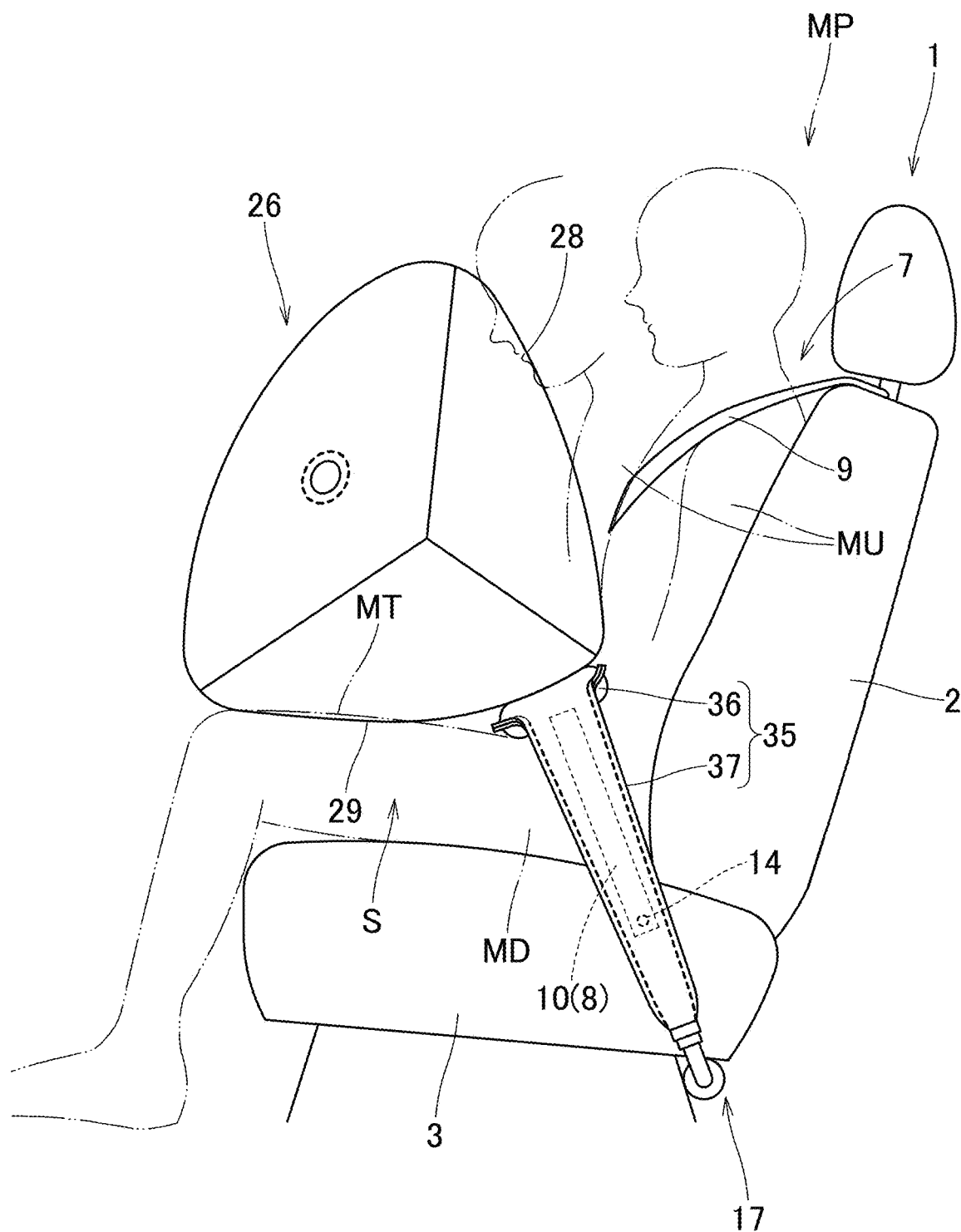
FIG. 17 is a side view of the seat in a state where the airbag completes inflation in the occupant protection device according to the embodiment.

The outer shape of the bag body 26 at the time of completion of inflation is a substantially triangular prism shape in which the axial direction is substantially along the left-right direction. Specifically, the bag body 26 is configured such that an inflation completed shape when viewed from the left and right sides is a substantially right triangular shape having an oblique side on the front side, and an inflation completed shape when viewed in the front-rear direction is a substantially rectangular shape having a wide width in the up-down direction (see FIGS. 16 and 17). As illustrated in FIGS. 5 and 6, the bag body 26 includes a rear wall portion 28 disposed on the occupant MP side (rear side) at the time of completion of inflation, a front wall portion 27 disposed to face the rear wall portion 28 in the front-rear direction, a lower wall portion 29 disposed at the lower end at the time of completion of inflation, and a left wall portion 30 and a right wall portion 31 disposed to face each other in the left-right direction at the time of completion of inflation. The bag body 26 is configured to receive the upper body MU of the occupant MP by the rear wall portion 28 when the inflation is completed. Further, the bag body 26 is configured to receive the occupant MP by bringing the lower wall portion 29 into contact with the thigh MT of the occupant MP and causing the thigh MT to support the lower wall portion 29 when the upper body MU is received by the rear wall portion 28 (see FIG. 17). The conduit portion 35 is connected to the lower face of the lower wall portion 29 of the bag body 26 at a rear end 29*a*. The bag body 26 is configured to allow the inflation gas from the inflator 17 to flow into the inside through the conduit portion 35. In a region of the lower wall portion 29 at the rear end 29*a*, a communication hole 33 communicating with the conduit portion 35 is opened in a circular shape, and in the case of the embodiment, two communication holes are disposed side by side in the left-right direction (see FIGS. 5 and 6). The bag body 26 is connected to the conduit portion 35 at the portion of the peripheral edge of the communication hole 33.

The conduit portion 35 is disposed so as to extend from the lower face of the bag body 26 to the left in the case of the embodiment, and is connected to the inflator 17 (specifically, the pipe portion 19 of the inflator 17). A proximal portion (right end), of the conduit portion 35, near the bag body 26 is closed. A distal end 37*a* (left end) of the conduit portion 35 is opened so as to be connectable to the pipe portion 19. Specifically, as illustrated in FIG. 5, the conduit portion 35 includes a wide body portion 36 located at the lower face of the bag body 26 and a connection portion 37 extending leftward from the bag body 26 when inflation is completed. The connection portion 37 is formed to be narrower than the body portion 36. The conduit portion 35 is disposed substantially along the left-right direction so as to be substantially along the lap belt 10 when the airbag 25 is completely inflated (see FIGS. 16 and 17). The distal end 37*a* (left end) of the connection portion 37 of the conduit portion 35 is connected to the pipe portion 19 of the inflator 17 using the clamp 20 as described above (see FIGS. 2 and 4).

As illustrated in FIGS. 5 and 6, the belt loop portion 40 is disposed on the lower face (that is, a region below the bag body 26) of the body portion 36 of the conduit portion 35.

The belt loop portion 40 has a substantially tubular shape disposed substantially along the left-right direction substantially along the lap belt 10, and is configured such that the lap belt 10 is allowed to be inserted therethrough. Specifically, in the case of the embodiment, the belt loop portion 40 is configured such that the belt body 8 in a state where the anchor member 14 is connected to the end portion 8a together with the anchor member 14 is allowed to be inserted therethrough. By inserting the lap belt 10 through the belt loop portion 40, the bag body 26 is held by the lap belt 10.

In the embodiment, the airbag 25 is configured to be held by the lap belt 10 so as to be displaced with respect to the lap belt 10 in a state where the region of the bag body 26 is folded in an elongated shape substantially along the lap belt 10. Specifically, although not illustrated in detail, the airbag 25 (bag body 26) is folded as described below. First, the bag body 26 is substantially flatly deployed by overlapping the front wall portion 27 with the rear wall portion 28 and the lower wall portion 29. Next, the bag body 26 in the flatly deployed state is folded so as to reduce the width dimension in the front-rear direction, thereby forming an elongated folding completion body 75 substantially along the left-right direction. The folding completion body 75 formed by folding the bag body 26 in this manner is disposed so as to be overlapped on the upper face when the lap belt 10 is worn together with the body portion 36 of the conduit portion 35 by inserting the lap belt 10 into the belt loop portion 40. The folding completion body 75 is disposed in a region of the lap belt 10 in a state where the periphery thereof, including the belt loop portion 40 and the lap belt 10, is covered with the airbag cover 45 (see FIGS. 3 and 15). In the case of the embodiment, the folding completion body 75 is disposed on the back face (the backrest portion 2 side) of the lap belt 10 exposed to the front face of the backrest portion 2 in the non-wearing state as illustrated in FIG. 1. In the case of the embodiment, the connection portion 37 of the conduit portion 35 is exposed to the upper face of the lap belt 10 on the left side of the folding completion body 75 (airbag cover 45) in the wearing state of the seat belt 7 (see FIGS. 3 and 4).

The airbag cover 45 that covers the periphery of the airbag 25 is formed of a flexible seat body. Specifically, the airbag cover 45 is made of a seat body (in the case of the embodiment, a seat body made of synthetic leather) such as synthetic leather or fabric.

Figure 7:
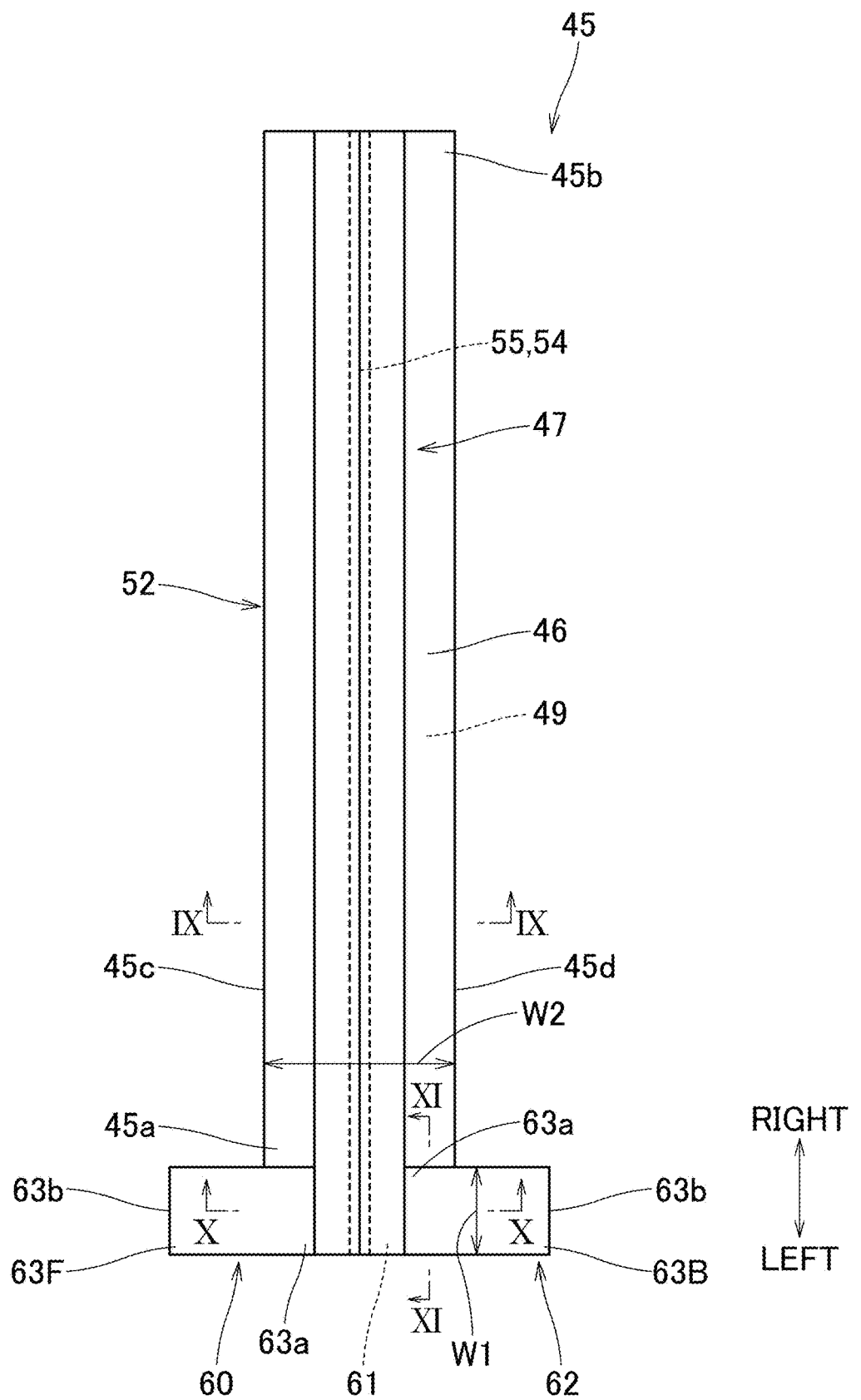
FIG. 7 is a plan view illustrating a state in which the airbag cover used in the occupant protection device according to the embodiment is flatly deployed.
Figure 8:
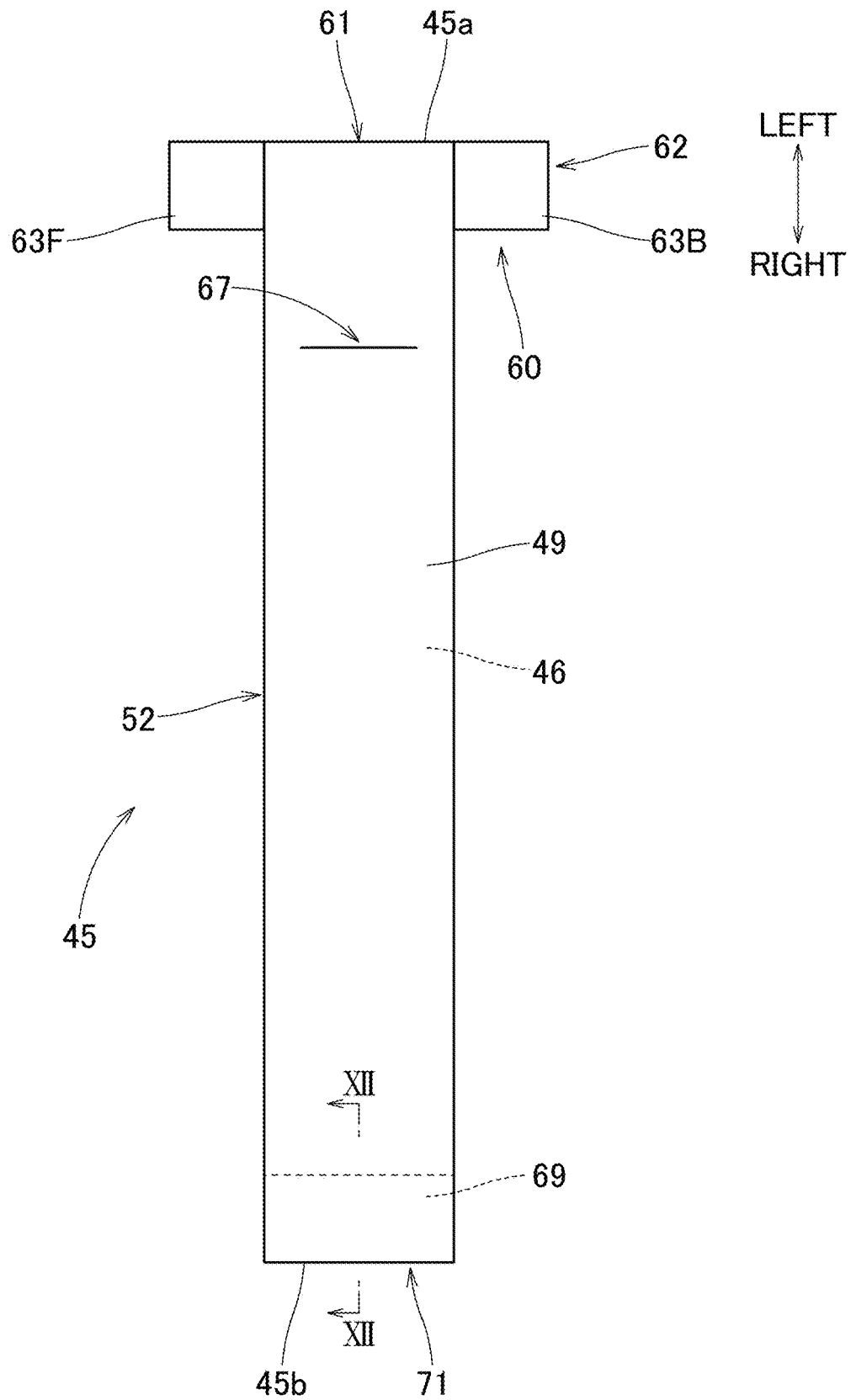
FIG. 8 is a bottom view of the airbag cover of FIG. 7.
Figure 15:
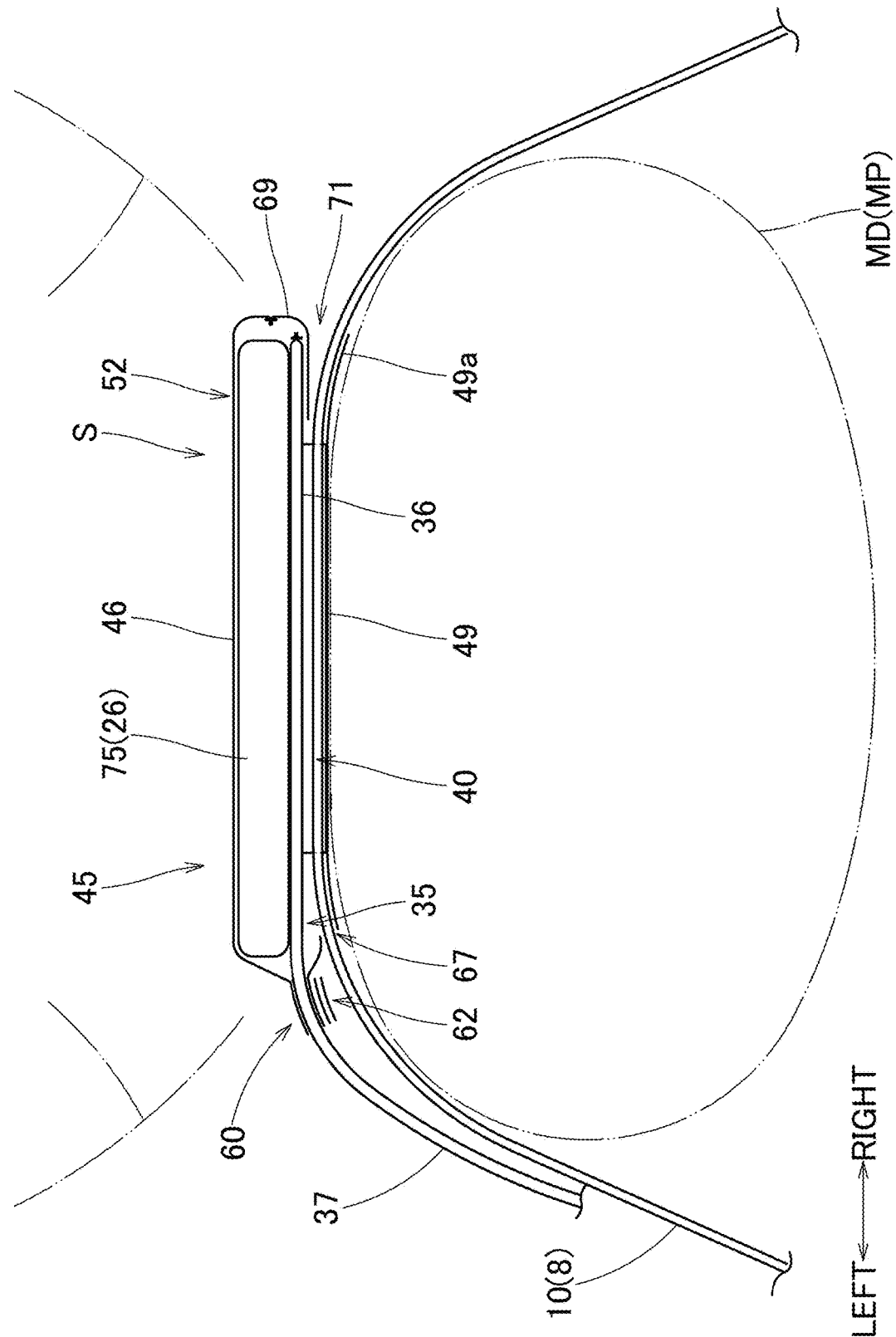
FIG. 15 is a schematic transverse sectional view illustrating a state in which the occupant protection device of the embodiment is mounted.

Specifically, as illustrated in FIGS. 3 and 15, the airbag cover 45 is configured to cover substantially the entire outer periphery of the folding completion body 75 formed by folding the bag body 26 and the body portion 36 of the conduit portion 35. At this time, an outer periphery of the belt loop portion 40 and part of the lap belt 10 disposed at the lower face of the body portion 36 are also covered with the airbag cover 45. As illustrated in FIGS. 7 and 8, the airbag cover 45 has an elongated outer shape whose longitudinal direction is substantially along the lap belt 10 (left-right direction in the wearing state). The airbag cover 45 includes a face side wall portion 46 covering the upper face of the folding completion body 75 and a back side wall portion 49 disposed at the lower face of the lap belt 10 in the wearing state of the seat belt 7. In the airbag cover 45 of the embodiment, as illustrated in FIG. 7, a design portion 47 is formed at a central portion of the face side wall portion 46 in the width direction, the design portion 47 being made of a base material different from that of the back side wall portion 49 and the remaining part of the face side wall portion 46. Specifically, the design portion 47 is continuously formed over the entire left and right lengths substantially along the longitudinal direction of the airbag cover 45.

In the case of the embodiment, although not illustrated in detail, the design portion 47 is made of a base material having a color tone different from that of the back side wall portion 49 and the remaining part of the face side wall portion 46.

As illustrated in FIGS. 7 to 11, the airbag cover 45 includes a substantially cylindrical main body 52 and an insertion opening portion 60 disposed at a left end 45a which is one end (in the case of the embodiment, on the conduit portion 35 side, specifically, near the connection portion 37 of the conduit portion 35) of the main body 52. Furthermore, the airbag cover 45 includes lap belt insertion portions (belt body insertion portions) 67 and 71 through which the lap belt 10 (belt body 8) is allowed to be inserted, at the left end 45a and the right end 45b, which are both ends in the longitudinal direction, respectively (see FIGS. 8 and 12 to 14). The right end 45b of the airbag cover 45, which is away from the conduit portion 35 (connection portion 37), is closed except for the lap belt insertion portion 71 disposed in the vicinity of the right end 45b. The airbag cover 45 is configured such that a width dimension is substantially constant over the entire left and right lengths in a state where the airbag cover is flatly deployed while an opening body 61 described later of the insertion opening portion 60 is opened (see FIGS. 7 and 8).

Figure 9:
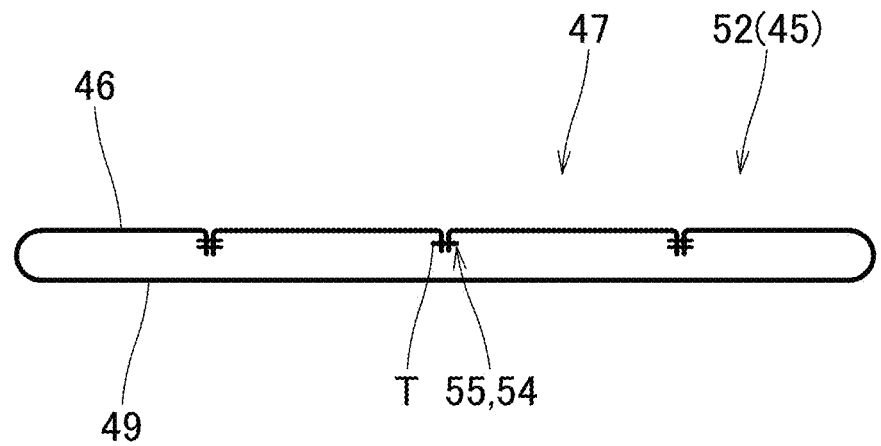
FIG. 9 is a schematic cross-sectional view taken along line IX-IX in FIG. 7.
Figure 10:
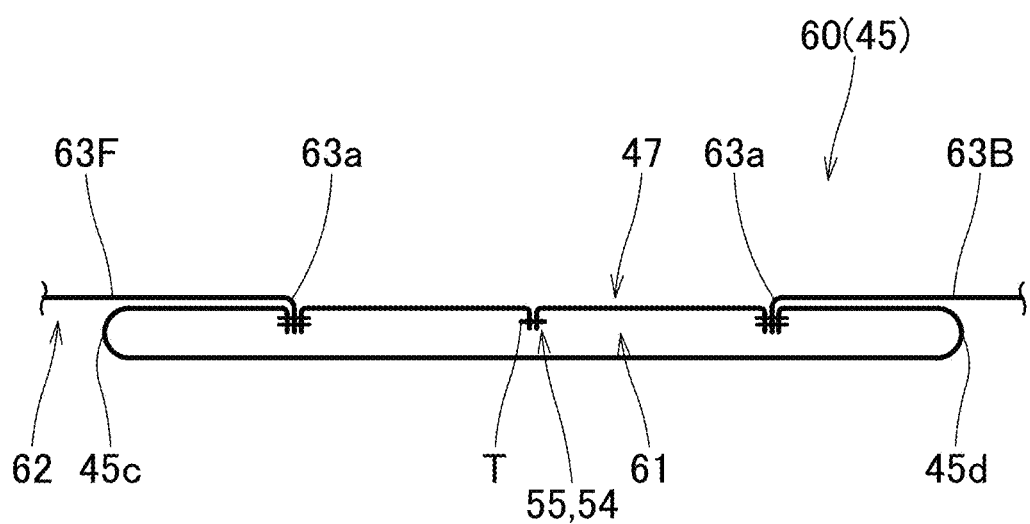
FIG. 10 is a schematic cross-sectional view taken along line X-X in FIG. 7.

The main body 52 houses the folding completion body 75 (specifically, the folding completion body 75, the body portion 36 of the conduit portion 35, the belt loop portion 40, and part of the lap belt 10 disposed at the lower face of the body portion 36). A tearable portion 55 that can be broken when the airbag 25 is inflated is formed in a region on the upper face of the main body 52 at the time of wearing, that is, a region of the face side wall portion 46. In the case of the embodiment, as illustrated in FIGS. 7, 9, and 10, the design portion 47 disposed on the face side wall portion 46 is configured to be divided into two at substantially the front and rear center (center in the width direction) in the wearing state, and the divided edge portions of the base material are sewn together by a suture portion 54 formed substantially along the left-right direction (longitudinal direction). The suture portion 54 is continuously disposed over the entire left and right lengths of the airbag cover 45 including the insertion opening portion 60. In the case of the embodiment, the suture portion 54 is formed using a suture T that is breakable when the bag body 26 is inflated. That is, the suture portion 54 (suture T) constitutes the tearable portion 55. The airbag cover 45 is configured such that the bag body 26 protrudes by breaking the suture T constituting the suture portion 54 when the airbag 25 (bag body 26) is inflated. The inner diameter dimension (width dimension in a flatly deployed state) of the main body 52 (airbag cover 45) is set to a dimension in which the folding completion body 75, the body portion 36 of the conduit portion 35, the belt loop portion 40, and the lap belt 10 is allowed to be inserted without any trouble.

Figure 11:
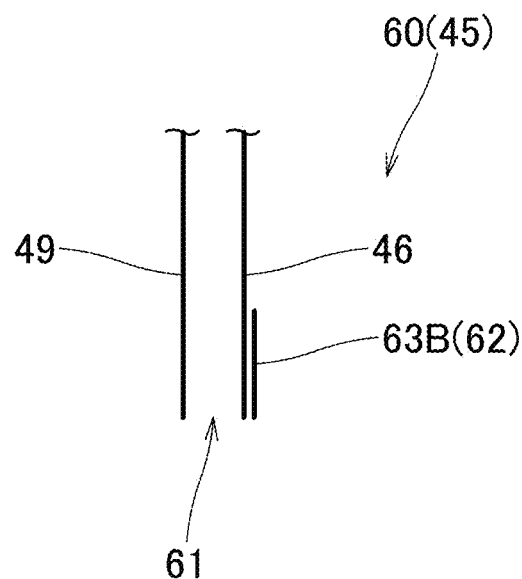
FIG. 11 is a schematic cross-sectional view taken along line XI-XI in FIG. 7.

As illustrated in FIGS. 7, 10, and 11, the insertion opening portion 60 includes an opening body 61 into which the folding completion body 75 is inserted, and a reduced diameter member 62 which is disposed around the opening body 61 and can reduce the diameter of the opening body 61. In the case of the embodiment, the opening body 61 is configured to open the left edge 52a of the main body 52. That is, the opening diameter of the opening body 61 is set substantially equal to the inner diameter dimension of the main body 52 (the width dimension of the main body 52 in a flatly deployed state), and the folding completion body 75 (specifically, the folding completion body 75, the body portion 36 of the conduit portion 35, the belt loop portion 40, and the lap belt 10) is allowed to be inserted without any trouble. The reduced diameter member 62 includes a strip body that can be wound around the opening body 61. Specifically, the reduced diameter member 62 includes two strip pieces (strip bodies) 63F and 63B extending in both front and rear directions in a state where the airbag cover 45 is flatly deployed (see FIGS. 7, 8, and 10).

Specifically, each of the strip pieces 63F and 63B is configured such that the proximal portion 63a is sewn (connected) to the front edge and the rear edge of the design portion 47 of the face side wall portion 46. In other words, the proximal portion 63a of each of the strip pieces 63F and 63B is connected to the airbag cover 45 (main body 52) at a position inside the front edge 45c and the rear edge 45d of the airbag cover 45 in the front-rear direction in a flatly deployed state (see FIGS. 7 and 10). Each of the strip pieces 63F and 63B is disposed such that the end edge substantially coincides with the end edge of the opening body 61. In the case of the embodiment, the width dimension W1 of each of the strip pieces 63F and 63B is set to about half of the width dimension W2 of the airbag cover 45 (main body 52) in a flatly deployed state (see FIG. 7).

Figure 13:
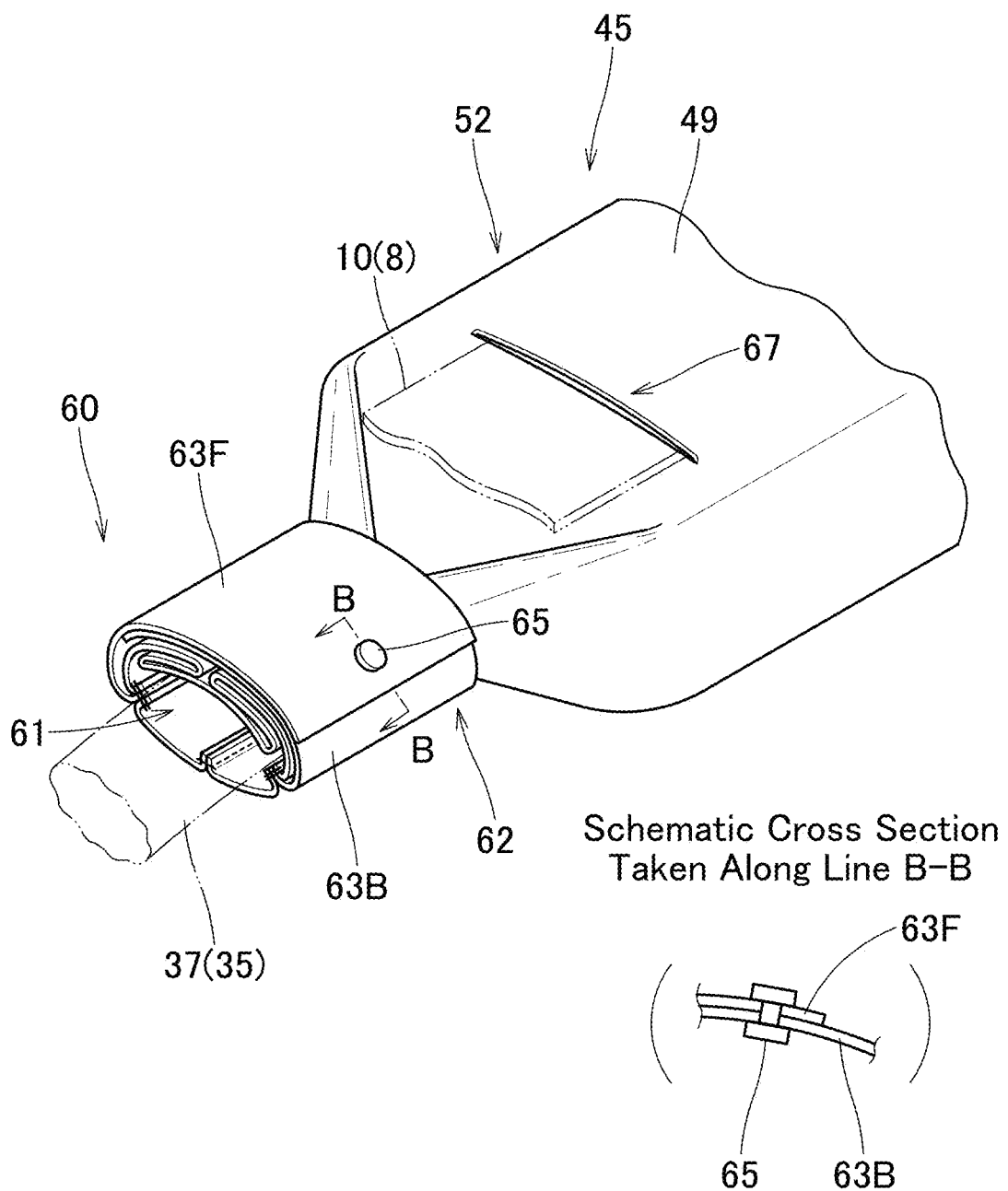
FIG. 13 is a schematic perspective view illustrating a region at a left end, of the airbag cover, which is near an insertion opening portion.

Then, in the airbag cover 45 of the embodiment, in a state where the folding completion body 75 is inserted into the main body 52 and the connection portion 37 of the conduit portion 35 is inserted into the opening body 61, the two strip pieces 63F and 63B are wound around the opening body 61 such that the distal ends 63b and 63b overlap. The overlapping strip pieces 63F, 63B are connected to each other using a fixing member 65 such as a rivet, so that the winding state around the opening body 61 by the strip pieces 63F, 63B is maintained (see FIG. 13). In the case of the embodiment, each of the strip pieces 63F and 63B is wound around the opening body 61 so that the distal ends 63b overlap each other at the back side wall portion 49 (see FIG. 13). The length dimension of each of the strip pieces 63F and 63B is set to a dimension such that at least the distal ends 63b and 63b can overlap at the time of winding around the opening body 61. At this time, as illustrated in FIG. 13, the portion of the peripheral edge of the opening body 61 and the connection portion 37 are reduced in diameter so as to be partially folded. By maintaining the winding of each of the strip pieces 63F and 63B around the opening body 61 as described above, the reduced diameter state of the opening body 61 and the connection portion 37 is maintained. In the embodiment, the reduced diameter state of the opening body 61 means a state in which only the connection portion 37 whose diameter is reduced is allowed to be inserted and a foreign substance such as a writing instrument cannot be inserted (a state not including a gap into which the foreign substance is allowed to be inserted). In the embodiment, since the reduced diameter state of the opening body 61 is maintained by the fixing member 65, the entry of foreign matter into the main body 52 can be stably restrained.

The lap belt insertion portion (belt body insertion portion) 67 formed at the left end 45a of the airbag cover 45, that is, at the insertion opening portion 60 is formed in a region in the vicinity of the left end of the main body 52 and closer to the center than the strip pieces 63F and 63B in the left and right direction. Specifically, as illustrated in FIGS. 8 and 13, the lap belt insertion portion 67 is configured by forming a linear cut (slit) in the back side wall portion 49 substantially along the front-rear direction. The length dimension (opening width dimension) of the lap belt insertion portion 67 is set to be smaller than the width dimension of the airbag cover 45 in the front-rear direction in a flatly deployed state, and is set to be slightly larger than the width dimension of the lap belt 10 (belt body 8). Specifically, the length dimension (opening width dimension) of the lap belt insertion portion 67 is set to a dimension in which the lap belt 10 (belt body 8) in a state where the anchor member 14 is connected is allowed to be inserted together with the anchor member 14.

Figure 12:
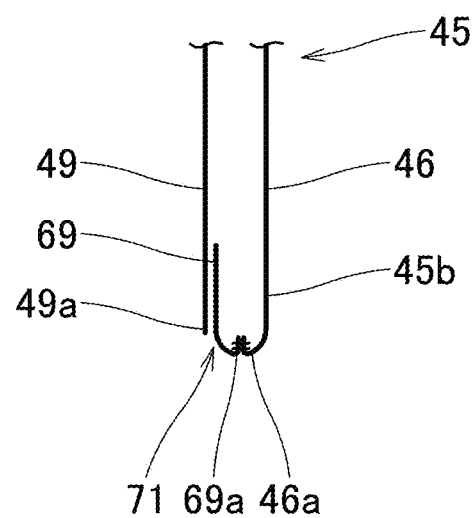
FIG. 12 is a schematic cross-sectional view taken along line XII-XII in FIG. 8.
Figure 14:
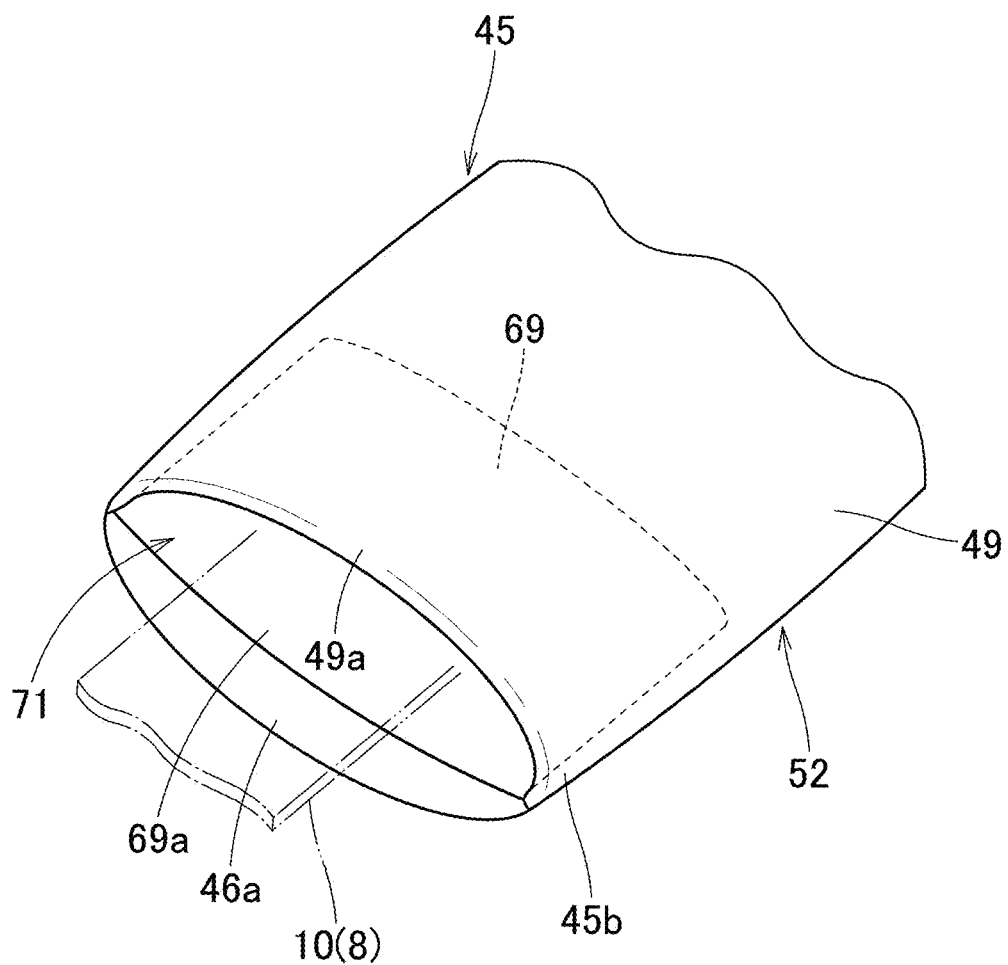
FIG. 14 is a schematic perspective view illustrating a region at a right end of the airbag cover.

In a region at the right end 45b of the airbag cover 45, a lid body portion 69 made of a base material separate from the back side wall portion 49 and the face side wall portion 46 is disposed so as to cover the inner periphery of a portion of the back side wall portion 49 at the right edge 49a. The right edge 69a of the lid body portion 69 is sewn (joined) to the right edge 46a of the face side wall portion 46 over substantially the entire front and rear areas (see FIGS. 12 and 14). The lid body portion 69 is disposed so as to overlap the back side wall portion 49, but is not coupled to the back side wall portion 49. That is, in the airbag cover 45 of the embodiment, the right edge 49a of the back side wall portion 49 is not coupled to the right edge 46a of the face side wall portion 46, and is configured such that a gap is provided (opened) with respect to the lid body portion 69. In the airbag cover 45 according to the embodiment, a gap formed between the back side wall portion 49 and the lid body portion 69 constitutes a lap belt insertion portion 71 (belt body insertion portion) as illustrated in FIGS. 12 and 14. That is, the lap belt insertion portion 71 disposed at the right end 45b of the airbag cover 45 has a width dimension (opening width dimension) in the front-rear direction substantially equal to a width dimension in the front-rear direction of the airbag cover 45 in a flatly deployed state. In other words, the opening width dimension of the lap belt insertion portion 71 is set to be larger than that of the lap belt insertion portion 67 provided at the left end 45a of the airbag cover 45. Of course, the lap belt insertion portion 71 provided at the right end 45b is configured so that the lap belt 10 (belt body 8) in a state where the anchor member 14 is connected is allowed to be inserted. At the portion at the right end 45b of the airbag cover 45, the right edge 69a of the lid body portion 69 and the right edge 46a of the face side wall portion 46 are sewn to each other over substantially the entire front and rear areas, and the right end 45b of the airbag cover 45 is configured such that only the lap belt 10 (belt body 8) is allowed to be inserted (the portion other than the lap belt insertion portion 71 is closed).

Next, mounting of the occupant protection device S according to the embodiment on the seat 1 will be described. First, the bag body 26 is folded to form the folding completion body 75, and a wrapping material (not illustrated) for preventing collapse is wound around an outer periphery of the folding completion body 75 and the body portion 36 of the conduit portion 35. Next, the distal end 37a of the connection portion 37 of the conduit portion 35 disposed to extend from the folding completion body 75 is coupled to the inflator 17 using the clamp 20 to form an airbag assembly. Then, the inflator 17 is attached to the seat frame 4 using a predetermined bracket (not illustrated). The belt body 8 of the seat belt 7 disposed so as to extend from a retractor (not illustrated) is inserted from the end portion 8a into the lap belt insertion portion 71 provided at the right end 45b of the airbag cover 45 together with the anchor member 14. Next, the end portion 8a of the belt body 8 is inserted into the belt loop portion 40 disposed at the lower face of the folding completion body 75 (more precisely, the lower face of the body portion 36) together with the anchor member 14. At the same time, the folding completion body 75 is inserted into the main body 52 of the airbag cover 45 from the opening body 61 of the insertion opening portion 60. The end portion 8*a* of the belt body 8 is inserted into the lap belt insertion portion 67 provided at the left end 45*a* of the airbag cover 45 together with the anchor member 14. Thereafter, in a state where the connection portion 37 of the conduit portion 35 protrudes from the airbag cover 45 (state where the connection portion 37 is inserted into the opening body 61), the two strip pieces 63F and 63B of the insertion opening portion 60 are wound around the opening body 61 so as to reduce the diameter of the opening body 61 and the diameter of the connection portion 37 while the distal ends 63*b* and 63*b* overlap. Then, the overlapping distal ends 63*b* and 63*b* of the strip pieces 63F and 63B are connected to each other using the fixing member 65 such as a rivet. In this manner, the occupant protection device S can be mounted on the seat 1. Next, the seat belt 7 can be attached to the seat 1 by fixing the end portion 8*a* of the belt body 8 to the rear left end 3*a* of the seat portion 3 of the seat 1 using the anchor member 14.

In the occupant protection device S according to the embodiment, when the inflator 17 is operated in a state where the occupant MP is seated on the seat 1 mounted on the vehicle while wearing the seat belt 7, the inflation gas discharged from the inflator 17 flows into the bag body 26 via the conduit portion 35. Then, the bag body 26 of the airbag 25 pushes open the airbag cover 45 so as to break the tearable portion 55, and protrudes forward and upward from the lap belt 10, and completes the inflation as illustrated by the two-dot chain line in FIGS. 3 and 4 and FIGS. 16 and 17.

In the occupant protection device S of the embodiment, the airbag cover 45 covering the periphery of the folding completion body 75 formed by y folding the airbag 25 (specifically, the bag body 26) is configured to cover an outer periphery of part of the belt body 8 (lap belt 10), but is configured to be closed such that at least the belt body 8 is allowed to be inserted between the left end 45*a* and the right end 45*b*. Therefore, at the time of wearing or the like, entry of foreign matter into the airbag cover 45 can be accurately restrained.

Therefore, in the occupant protection device S of the embodiment, even in a configuration in which only the periphery of the folded airbag 25 is covered, the entry of foreign matter into the airbag cover 45 can be restrained.

In the occupant protection device S of the embodiment, the airbag cover 45 covers only an outer periphery of the folding completion body 75 and part of the belt body 8 (lap belt 10). Therefore, the occupant protection device S can be made compact, as compared with the conventional occupant protection device, and the seat belt 7 (belt body 8) can be easily worn by the occupant MP.

Further, in the occupant protection device S of the embodiment, the airbag cover 45 includes the insertion opening portion 60 configured to be able to insert the folding completion body 75 at the left end 45*a* close to the conduit portion 35. Although the insertion opening portion 60 includes the opening body 61 into which the folding completion body 75 is inserted, the diameter of the opening body 61 can be reduced by the reduced diameter member 62 disposed around the opening body 61 after the folding completion body 75 is inserted into the airbag cover 45. That is, in the occupant protection device S of the embodiment, after the folding completion body 75 is inserted into the airbag cover 45 from the opening body 61 of the insertion opening portion 60, the diameter of the opening body 61 can be reduced by the reduced diameter member 62, and the reduced diameter state of the opening body 61 in a state where the conduit portion 35 (specifically, the connection portion 37 of the conduit portion 35) protrudes can be maintained. Therefore, the operation of housing the folding completion body 75 in the airbag cover 45 can be easily performed. In addition, since the reduced diameter state of the opening body 61 can be maintained, the opening (release of the reduced diameter state) of the opening body 61 after the folding completion body 75 is housed can be accurately suppressed. Therefore, entry of foreign matter into the airbag cover 45 at the time of wearing the seat belt 7 or the like can also be accurately restrained. When such a point is not taken into consideration, the airbag cover need not include the insertion opening portion and may simply include only the opening for inserting the folding completion body. In such an airbag cover, after the folding completion body is inserted into the airbag cover, the opening portion is closed by a sewing operation such as hand sewing.

In the occupant protection device S of the embodiment, the insertion opening portion 60 is disposed only at the left end 45*a* of the airbag cover 45. The airbag cover may have a configuration in which an insertion opening portion having such a configuration may be disposed at both left and right ends. When the airbag cover having such a configuration is used, both ends of the airbag cover can be largely opened at the time of inserting the folding completion body into the airbag cover. Therefore, the operation of inserting the folding completion body into the airbag cover is easier, and for example, the user can replace a desired cover unit by a dealer or the like.

Furthermore, in the occupant protection device S of the embodiment, the reduced diameter member 62 includes strip bodies (strip pieces 63F, 63B) that can be wound around the opening body 61, and the state in which the strip pieces 63F and 63B are wound around the opening body 61 can be maintained by the fixing member 65 such as a rivet. That is, in the occupant protection device S of the embodiment, it is possible to maintain the reduced diameter state of the peripheral edge of the opening body 61 by being pressed by the strip pieces 63F and 63B. Therefore, even in a state where the conduit portion 35 (specifically, the connection portion 37 of the conduit portion 35) is inserted, the reduced diameter state of the opening body 61 can be stably maintained. When such a point is not taken into consideration, for example, a configuration in which the diameter of the peripheral edge of the opening body can be reduced in a purse-like manner and this reduced diameter state can be maintained may be used as the reduced diameter member. In the embodiment, the rivet is used as the fixing member 65, but the fixing member is not limited to the rivet. For example, as the fixing member, any member that cannot be easily released from the fixed state, such as a member like a staple, and a snap body or a hook body that can be fitted, can be used. In addition, the strip pieces may be directly bonded to each other using an adhesive or the like.

Specifically, in the airbag cover 45 in the occupant protection device S of the embodiment, two strip pieces 63F and 63B are disposed so as to extend in both front and rear directions in a state where the airbag cover 45 is flatly deployed. In addition, each of the strip pieces 63F and 63B has a configuration in which the proximal portion 63*a* is connected to the airbag cover 45 (main body 52) at a position closer to the center in the front-rear direction than the front edge 45*c* and the rear edge 45*d* of the airbag cover 45 in the flatly deployed state. Therefore, the diameter of the opening body 61 can be easily reduced by simply winding the strip pieces 63F and 63B around the opening body 61, and the winding operation is easy. Further, each of the strip pieces 63F and 63B is formed to have a width dimension W1 as wide as about a half of a width dimension W2 of the airbag cover 45 in a flatly deployed state. Therefore, the periphery of the opening body 61 can be pressed in a wide region, and the reduced diameter state of the opening body 61 can be stably maintained. In the airbag cover 45 of the embodiment, the lap belt insertion portion 67 for inserting the lap belt 10 (belt body 8) is disposed separately from the insertion opening portion 60. That is, the lap belt 10 is not inserted into the opening body 61 of the insertion opening portion 60, and only the connection portion 37 of the conduit portion 35 is inserted. Therefore, the reduced diameter state of the opening body 61 can be stably maintained. Of course, the shapes and the arrangement positions of the strip pieces are not limited to the embodiment. For example, only one strip piece may be provided, and the strip piece may extend from only one side of the front edge or the rear edge of the airbag cover. Furthermore, the strip piece (strip body) may be disposed separately from the airbag cover.

Figure 18:
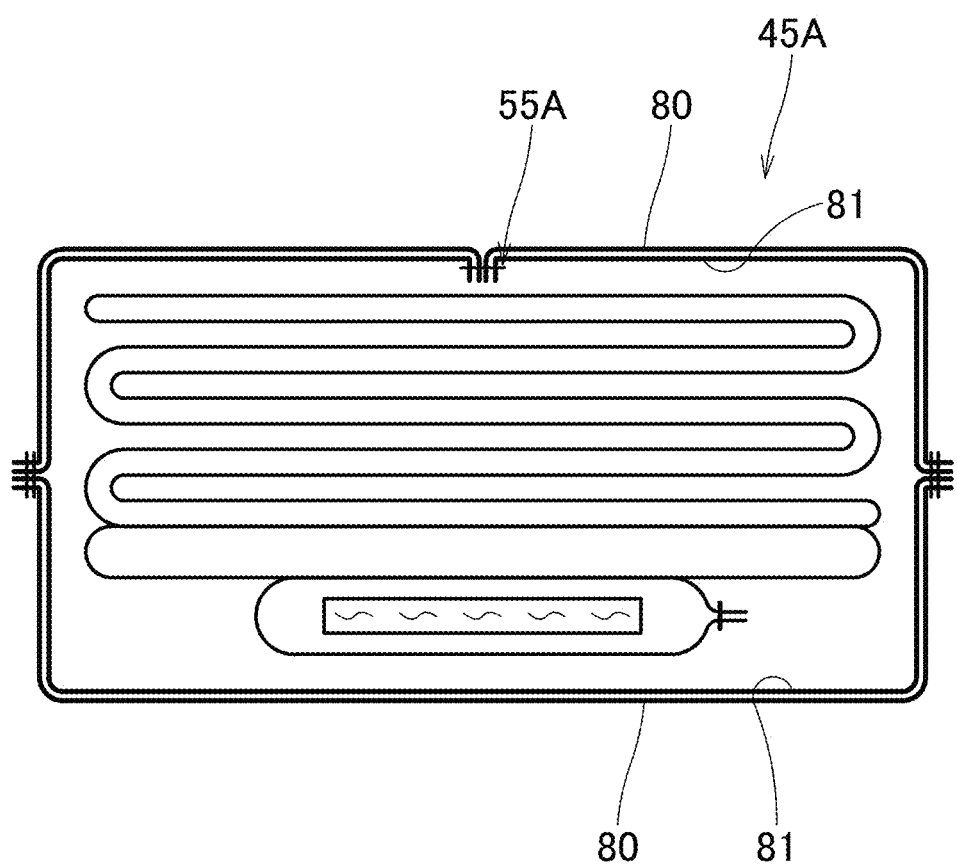
FIG. 18 is a schematic cross-sectional view illustrating an airbag cover according to another embodiment of the present disclosure.

In the occupant protection device S of the embodiment, the airbag cover is made of synthetic leather, but of course, the material constituting the airbag cover is not limited to synthetic leather. The airbag cover may be made of a mesh material or the like in consideration of the skin texture or the like at the time of wearing. When a relatively soft material such as a mesh material is used for the airbag cover, as illustrated in FIG. 18, as an airbag cover 45A, it is preferable that a reinforcing layer 81 made of a high-strength material (for example, a non-coated fabric or the like used as a base material of an airbag) is disposed on the inner circumferential face of a skin layer 80 made of a mesh material or the like to form a two-layered shape. This is because even when the mesh material is used, a portion of a tearable portion 55A is stably broken when the airbag is inflated.

In the occupant protection device S according to the embodiment, the seat belt 7 and the inflator 17 are mounted on the seat 1. Therefore, even when the seat 1 is used while being moved with respect to the vehicle by greatly sliding or rotating the seat 1 forward and backward, the occupant MP seated on the seat 1 can be accurately protected by the airbag 25. Of course, the occupant protection device of the present invention is not limited to the seat having such a configuration, the occupant protection device can be mounted on a seat of which the retractor of the seat belt is provided on the vehicle body side. The inflator may be attached to the body of the vehicle. Although the occupant protection device S according to the embodiment has a configuration in which the lap belt 10 of the seat belt 7 holds the airbag 25, the inflator 17 operates later (about 5 ms) than the pretensioner mechanism of the seat belt 7. Therefore, the airbag 25 can be inflated while the seat belt 7 stably maintains the seated state of the occupant MP with respect to the seat 1, and the occupant MP can be stably protected by the airbag 25 and the seat belt 7.

In the embodiment, the occupant protection device S having a configuration in which the airbag 25 is disposed in the area of the lap belt 10 is taken as an example and described. However, the occupant protection device to which the present invention can be applied is not limited to the embodiment. The present invention is also applicable to an occupant protection device configured to dispose an airbag in a region of a shoulder belt. In the embodiment, the airbag 25 having a configuration in which the conduit portion 35 for supplying the inflation gas to the bag body 26 is disposed as part of a member of the airbag 25 is used. However, the occupant protection device to which the present invention can be applied is not limited to the airbag of the embodiment. The present invention is also applicable to an occupant protection device configured to connect a conduit portion formed of a cylindrical body or the like separate from an airbag to the airbag.

The present disclosure relates to an occupant protection device having the following configuration.

An occupant protection device of the present disclosure is mounted on a seat of a vehicle,
the occupant protection device including a seat belt,
an inflator,
an airbag that is attached to a belt body of the seat belt in a folded state and is inflatable so as to allow an inflation gas discharged from the inflator to flow into the airbag to protrude forward and protect an occupant seated on the seat when the inflator is operated, and
an airbag cover that covers a periphery of a folding completion body corresponding to a state where the airbag is folded,
wherein
the airbag cover has an elongated shape capable of covering an outer periphery of part of the belt body and the folding completion body, and is closed at both ends in a longitudinal direction such that at least the belt body is allowed to be inserted therethrough.

In the occupant protection device of the present invention, the airbag cover that covers the periphery of the folding completion body formed by folding the airbag is configured to cover an outer periphery of part of the belt body, but is configured to be closed such that at least the belt body is allowed to be inserted at both ends in the longitudinal direction. Therefore, at the time of wearing or the like, entry of foreign matter into the airbag cover can be appropriately restrained.

Therefore, the occupant protection device of the present disclosure can restrain entry of foreign matter into the airbag cover even when the airbag cover covers only the periphery of the folded airbag.

In the occupant protection device of the present disclosure, the airbag cover covers only an outer periphery of the folding completion body and part of the belt body. Therefore, the occupant protection device can be made compact, compared with the conventional occupant protection device, and the seat belt (belt body) can be easily worn by the occupant.

Further, in the occupant protection device of the present disclosure, it is preferable that the airbag includes a bag body that inflates so as to protect the occupant, and a conduit portion that is connected to the inflator and allows an inflation gas to flow into the bag body,
the airbag cover includes, at least at an end portion on the conduit portion side, an insertion opening portion into which a folding completion body formed by folding the bag body is allowed to be inserted,
the insertion opening portion includes an opening body into which a folding completion body is inserted, and a reduced diameter member disposed around the opening body and capable of reducing a diameter of the opening body after insertion of the folding completion body into the airbag cover, and
the reduced diameter member is configured to be able to maintain the reduced diameter state of the opening body in a state where the conduit portion protrudes when the diameter is reduced.

With such a configuration of the occupant protection device, after the folding completion body is inserted into the airbag cover from the opening body of the insertion opening portion, the diameter of the opening body can be reduced by the reduced diameter member, and the reduced diameter state of the opening body in a state where the conduit portion protrudes can be maintained. Therefore, the operation of housing the folding completion body in the airbag cover can be easily performed. In addition, since the reduced diameter state of the opening body can be maintained, the opening (release of the reduced diameter state) of the opening body after the folding completion body is housed can be accurately suppressed. As a result, entry of foreign matter into the airbag cover at the time of wearing the seat belt or the like can also be accurately restrained.

Furthermore, in the occupant protection device having the above configuration, it is preferable that the reduced diameter member includes a strip body capable of being wound around the opening body, and the strip body can be maintained in a wound state around the opening body by the fixing member. That is, since the strip body is wound around the opening body to reduce the diameter of the opening body and this reduced diameter state is maintained using the fixing member, it is possible to maintain the reduced diameter state of the peripheral edge of the opening body by being pressed by the strip body. Therefore, even in a state where the conduit portion is inserted, it is possible to stably maintain the reduced diameter state of the opening body.

What is claimed is:

1. An occupant protection device mounted on a seat of a vehicle, the occupant protection device comprising:
    a seat belt;
    an inflator;
    an airbag that is attached to a belt body of the seat belt in a folded state and is inflatable so as to allow an inflation gas discharged from the inflator to flow into the airbag to protrude forward and protect an occupant seated on the seat when the inflator is operated; and
    an airbag cover that covers a periphery of a folding completion body corresponding to a state where the airbag is folded,
    wherein
    the airbag cover has an elongated shape capable of covering an outer periphery of part of the belt body and the folding completion body, and is closed at both ends in a longitudinal direction such that at least the belt body is allowed to be inserted therethrough,
    the airbag includes a bag body that inflates so as to protect the occupant, and a conduit portion that is connected to the inflator and allows an inflation gas to flow into the bag body,
    the airbag cover includes an insertion opening portion into which the folding completion body is allowed to insert at least at an end portion close to the conduit portion.

2. The occupant protection device according to claim 1, wherein
    the insertion opening portion includes an opening body into which the folding completion body is inserted, and a reduced diameter member disposed around the opening body and capable of reducing a diameter of the opening body after the folding completion body is inserted into the airbag cover, and wherein
    the reduced diameter member is configured to maintain a reduced diameter state of the opening body in a state where the conduit portion protrudes when the diameter is reduced.

3. The occupant protection device according to claim 2, wherein
    the reduced diameter member includes a strip body capable of being wound around the opening body, and is configured to maintain a state in which the strip body is wound around the opening body by a fixing member.

4. The occupant protection device according to claim 2, wherein
    the airbag cover includes a belt body insertion portion that is closed at an end portion away from the conduit portion and into which the belt body is allowed to be inserted near the end portion.

5. The occupant protection device according to claim 3, wherein
    the airbag cover includes a belt body insertion portion into which the belt body is allowed to be inserted near the insertion opening portion.

6. The occupant protection device according to claim 1, wherein
    the airbag is disposed in a region of a lap belt that restrains a lower body of the occupant seated on the seat.

7. The occupant protection device according to claim 1, wherein
    the seat belt and the inflator are mounted on a seat.

8. An airbag cover for use in an occupant protection device mounted on a seat of a vehicle,
    the airbag cover configured to cover a periphery of an airbag attached to a belt body of a seat belt,
    wherein
    the airbag cover has an elongated shape capable of covering an outer periphery of part of the belt body and a folding completion body obtained by folding the airbag, and is closed at both ends in a longitudinal direction such that at least the belt body is allowed to be inserted therethrough,
    the airbag cover comprises a main body that houses the folding completion body; and an insertion opening portion formed at least at one end and configured such that the folding completion body is allowed to be inserted into the main body.

9. An airbag cover for use in an occupant protection device mounted on a seat of a vehicle,
    the airbag cover configured to cover a periphery of an airbag attached to a belt body of a seat belt,
    wherein
    the airbag cover has an elongated shape capable of covering an outer periphery of part of the belt body and a folding completion body obtained by folding the airbag, and is closed at both ends in a longitudinal direction such that at least the belt body is allowed to be inserted therethrough,
    the airbag cover includes a main body that houses the folding completion body; and an insertion opening portion formed at least at one end and configured such that the folding completion body is allowed to be inserted into the main body, wherein
    the insertion opening portion includes an opening body into which the folding completion body is inserted, and a reduced diameter member disposed around the opening body and capable of reducing a diameter of the opening body after the folding completion body is inserted into the main body, and wherein
    the reduced diameter member is configured to maintain a reduced diameter state of the opening body in a state where a conduit portion of the airbag protrudes when the diameter is reduced.

10. The airbag cover according to claim 9, wherein
    the reduced diameter member includes a strip body capable of being wound around the opening body, and is configured to maintain a state in which the strip body is wound around the opening body by a fixing member.

11. The airbag cover according to claim 9, wherein
an end portion away from the conduit portion is closed, and further comprising
a belt body insertion portion that is arranged near the end portion and into which the belt body is allowed to be inserted.

12. The airbag cover according to claim 10, further comprising
a belt body insertion portion into which the belt body is allowed to be inserted near the insertion opening portion.

* * * * *